Sept. 16, 1924.
G. A. BONELLI
THERMOSTATIC CONTROL
Filed Nov. 11, 1920
1,508,872
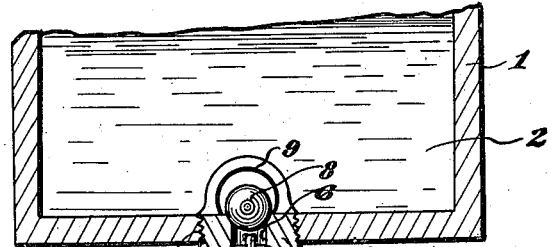
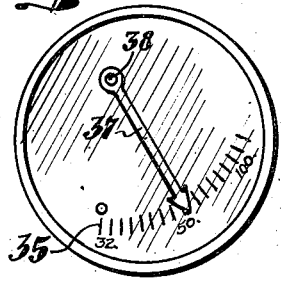
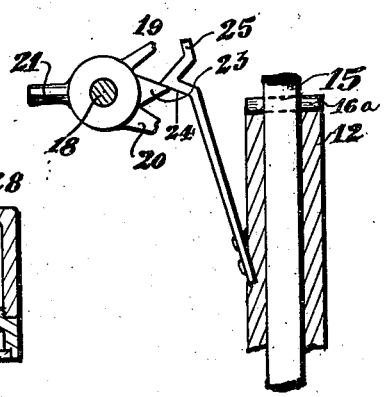
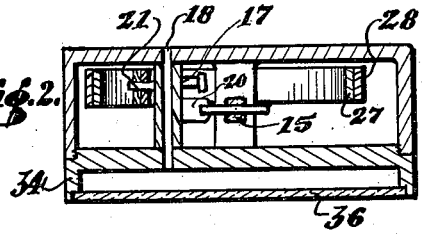
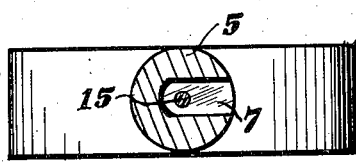
INVENTOR
George A. Bonelli.
by Hazard & Miller
ATT'YS.

Patented Sept. 16, 1924.

1,508,872

UNITED STATES PATENT OFFICE.

GEORGE A. BONELLI, OF KINGMAN, ARIZONA.

THERMOSTATIC CONTROL.

Application filed November 11, 1920. Serial No. 423,473.

*To all whom it may concern:*

Be it known that I, GEORGE A. BONELLI, a citizen of the United States, residing at Kingman, in the county of Mohave and State of Arizona, have invented new and useful Improvements in Thermostatic Controls, of which the following is a specification.

It is the object of this invention to provide a thermostatic control having means operable through changes in temperature which may be employed to open or close a valve for a liquid containing receptacle. The thermostatic control may thus be adjusted to cause opening of the valve and the discharge of the liquid from the receptacle when a temperature is reached which is liable to cause freezing of the liquid and consequent bursting of the receptacle. The thermostatic control will also provide for the closing of the valve as soon as a temperature is reached where the danger of freezing has passed in order to adapt the receptacle to again hold liquid.

While in the present embodiment of the invention I have illustrated the thermostatic control as applicable for the specific purpose as above set forth, it will be understood that it is of general utility, and may be employed wherever it is desired to control an actuating member by thermostatic means.

The invention will be readily understood from the following description of the accompanying drawings, in which;

Figure 1 is a longitudinal section through a device constructed in accordance with the invention.

Figs. 2 and 3 are transverse sections on the lines 2—2 and 3—3 of Fig. 1.

Fig. 4 is an enlarged longitudinal section showing the spring trip for the actuating mechanism of the thermostatic control.

Fig. 5 is a front elevation showing the dial of the thermostatic control.

In the drawings a receptacle 1 is shown which may be a portion of a radiator, boiler, or the like, said receptacle containing a liquid 2. A threaded discharge port 3 is provided in said receptacle.

The thermostatic control is mounted in a casing 4 which terminates in a nipple 5 adapted to be threaded into the discharge port 3. The nipple is provided with a bore 6 communicating with the interior of receptacle 1 and, preferably, terminating in a discharge port 7 leading from the nipple 5 outside of the casing of the thermostatic control. The bore 6 forms a valve seat for a valve shown as a ball valve 8, and the movement of the latter inwardly to open the bore 6 to the receptacle 1, is, preferably, limited by a cage 9 mounted upon the end of the nipple and received over the ball valve.

A support 12 is arranged in casing 4 projecting from the rear wall 13 of said casing, and this support is provided with a bore 14 forming a guideway for a square rod 15 which extends through the casing 4 and into bore 6 so that elevation of said rod will cause the latter to abut against ball valve 8 and unseat the same, while depression of the rod will permit the ball valve to drop by gravity to shut off the flow of liquid from receptacle 1 through bore 6 and the discharge port 7. The lower end of rod 15, preferably, projects beyond casing 4 and is provided with a head 15$^a$ for grasping the same. A pin 16$^a$ extending through rod 15 and abutting against the end of support 12 is arranged to prevent the removal of rod 15 from support 12 and the casing 4.

The actuating mechanism for raising and lowering rod 15 includes a pin 16 projecting from the rod and arranged to be engaged by a member 17 pivotally mounted upon a shaft 18 extending across casing 4. This rotatable member is provided with radial fingers or projections 19 and 20 adapted to impinge against the upper and lower sides of pin 16 respectively as the rotatable member is rocked upon shaft 18. A radial finger 21 projects from member 17 at the opposite side of its pivotal mounting and is actuated by the thermal responsive member of the apparatus in order to rock member 17 in opposite directions and thereby move rod 15 in opposite directions.

In order to prevent undue fluctuation of member 17 responsive to slight movements of the thermal controlled member, a wedge 23, preferably, projects from member 17 between the arms 19 and 20. This wedge is engaged by a wedge shaped projection 24 formed in a spring strip 25 which may be mounted upon the support 12. The wedge 24 is projected by spring strip 25 so as to engage wedge 23 and thereby prevent rocking of member 17 until there has been a sufficient change in temperature to exert the necessary pressure against finger 21 for overcoming the tension of the spring strip 25. As a result the member 17 will not be rocked and the rod 15 will not be reciprocated until there is a material change in temperature.

The thermal responsive member engaging finger 21 comprises two strips of different metals as shown at 27 and 28. These strips are riveted together and are formed into a coil with one end of the coil fastened to casing 4 as shown at 30, and the opposite end of the coil provided with a slot 31 in which finger 21 is received. The coefficience of expansion of the different metals forming strips 27—28 vary greatly, so that as the coil expands or contracts responsive to temperature variations, the free end of the coil engaging finger 21 will be moved in a direction to cause abutments of the ends of slot 31 against finger 21 for rocking member 17 as above described. It will thus be seen that variations in temperature will open or close valve 8, the device being constructed that a reduction in temperature will cause valve 8 to open and thereby permit the liquid to flow from receptacle 1.

The thermal responsive device may be adjusted to cause closing of valve 8 at different temperatures by means of a set screw 33 projecting through casing 4 and adapted to impinge against the coil forming the thermal responsive device.

A removable front 34 is, preferably, provided for casing 4 and a graduated dial 35 may be provided upon its front. A glass plate 36 may cover the dial. An indicator 37 is adapted to move across the graduations 35, said indicator being, preferably, fixed upon a shaft 38 journaled in the casing. A pinion 39 is fixed upon shaft 38 and is arranged to mesh with a rack 40 fixed upon the thermal responsive coil, so that as the latter moves, the pinion and its shaft will be rotated for moving the indicator 37 with relation to the graduations 35. The device will thus form temperature registering means as well as an actuating device responsive to variations in temperature.

Various changes may be made without departing from the spirit of the invention as claimed.

What is claimed is:

1. A thermostatic control including a temperature controlled movable member, an operating member actuated by the movement of said member, and a spring strip co-operating with said movable member to prevent fluctuation of the same between certain temperatures.

2. A thermostatic control including a casing, an exteriorly screw-threaded nipple extending from the casing and adapted to be screwed into a discharge port and having a bore opening through its end and an outlet port and a valve seat in the bore, a valve normally in the valve seat, a support extending into the casing chamber in line with the bore, a rod slidably mounted through the support and extending into the bore to engage the valve, and a temperature control mechanism mounted in the casing for operating the rod.

3. A thermostatic control including a casing, an exteriorly screw-threaded nipple extending from the casing and adapted to be screwed into a discharge port and having a bore opening through its end and an outlet port and a valve seat in the bore, a valve normally in the valve seat, a support extending into the casing chamber in line with the bore, a rod slidingly mounted through the support and extending into the bore to engage the valve, a thermo-responsive member mounted in the casing and connected to the rod, and a set screw mounted through the casing to engage the thermo-responsive member to regulate the temperature at which it will operate said rod in one direction.

4. A thermostatic control including a temperature controlled movable member having a projection, an operating member actuated by movement of said member, and co-acting means associated with the movable member for preventing fluctuation of the movable member between certain temperatures comprising a projection yieldably engaging a projection on the movable member.

5. A thermostatic control comprising a temperature controlled movable member, projections formed on the member, an operating member, a projection on the operating member adapted to be engaged by the projections of the movable member for effecting actuation of the operating member, a finger on the movable member, and a yieldable finger sustained independently of the operating member and adapted to co-act with the finger on the movable member to prevent actuation of the movable member between certain temperatures.

6. A thermostatic control comprising a temperature controlled movable member, projections formed on the member, an operating member, a projection on the operating member adapted to be engaged by the projections of the movable member for effecting actuation of the operating member, and yieldable means associated with the movable member for preventing fluctuation thereof between certain temperatures.

7. A thermostatic control comprising a thermal-responsive element provided with a slot, a movable member including an extension engaging within the slot to effect movement of the movable member upon expansion or contraction of said element, spaced fingers formed on the movable member, an operating member, and a projection on the operating member adapted to be engaged by either of the fingers of the movable member for actuating the operating member.

8. A thermostatic control comprising a thermal-responsive element provided with a slot, a movable member including an extension engaging within the slot to effect movement of the movable member upon expansion or contraction of said element, spaced fingers formed on the movable member, an operating member, a projection on the operating member adapted to be engaged by either of the fingers of the movable member for actuating the operating member, a projection on the movable member, and a yieldable member supported independently of the movable member and engaging the last mentioned projection for the purpose described.

9. A thermostatic control comprising a thermal-responsive element provided with a slot, a movable member including an extension engaging within the slot to effect movement of the movable member upon expansion or contraction of said element, spaced fingers formed on the movable member, an operating member, a projection on the operating member adapted to be engaged by either of the fingers of the movable member for actuating the operating member, and an adjustable member adapted to engage the thermal-responsive device for the purpose described.

10. A thermostatic control comprising a thermal-responsive device in the form of a helix, a rack secured to the helix, a pinion engaging the rack, a shaft to which said pinion is secured, an indicating hand secured to the shaft, a movable member operable by movement of the helix, and an operating member actuated by movement of the movable member.

11. A thermostatic control comprising a thermal-responsive device in the form of a helix, a rack secured to the helix, a pinion engaging the rack, a shaft to which said pinion is secured, an indicating hand secured to the shaft, a graduated dial over which said hand is adapted to move, a movable member operable by movement of the helix, and an operating member actuated by movement of the movable member.

In testimony whereof I have signed my name to this specification.

GEO. A. BONELLI.